United States Patent [19]

Patel et al.

[11] Patent Number: 4,935,820
[45] Date of Patent: Jun. 19, 1990

[54] IMAGING SLOW PHOTOGRAPHIC MEDIA WITH LIQUID CRYSTAL SHUTTERS

[75] Inventors: Ranjan C. Patel, Little Hallingbury; John H. A. Stibbard, Harlow; Ronald G. Tye, Bishop's Stortford, all of England; Donald J. Newman, White Bear Lake, Minn.

[73] Assignee: Minnesota Mining and Manufacturing Company, St. Paul, Minn.

[21] Appl. No.: 296,957

[22] Filed: Jan. 17, 1989

[30] Foreign Application Priority Data

Jan. 29, 1988 [GB] United Kingdom ............... 8802025

[51] Int. Cl.$^5$ .................... H04N 1/23; G01D 9/42; G02F 1/13
[52] U.S. Cl. ................ 358/302; 346/107 R; 350/332; 350/350 S
[58] Field of Search ............ 350/350 S, 332; 358/296, 302, 75; 346/160, 157, 107 R, 108

[56] References Cited

U.S. PATENT DOCUMENTS

| Re. 32,099 | 3/1986 | Hill | 346/108 |
|---|---|---|---|
| 4,040,047 | 8/1977 | Hareng | 350/350 S |
| 4,278,981 | 7/1981 | Hill | 346/108 |
| 4,367,924 | 1/1983 | Clark | 350/350 S |
| 4,605,972 | 8/1986 | Hatanaka | 358/296 |
| 4,639,127 | 1/1987 | Beery | 358/75 |
| 4,675,702 | 6/1987 | Gerber | 346/107 R |

Primary Examiner—Bruce A. Reynolds
Assistant Examiner—Scott A. Rogers
Attorney, Agent, or Firm—Donald M. Sell; Walter N. Kirn; Mark A. Litman

[57] ABSTRACT

Method and apparatus for producing a color image on a photosensitive medium having low sensitivity in which color separation image masks are sequentially generated in a smectic liquid crystal device which may be controlled by a computer and the photosensitive medium is exposed through the image mask. The separation image masks may be altered during exposure to compensate for uneven illumination and to achieve tonal scales.

12 Claims, 2 Drawing Sheets

1

2

3

4

5

6

7

8

IMAGING SLOW PHOTOGRAPHIC MEDIA WITH LIQUID CRYSTAL SHUTTERS

FIELD OF THE INVENTION

This invention relates to a method of imaging and to apparatus for use therein. In particular the invention relates to a method of imaging low sensitivity materials to produce hardcopies of electronically stored images with an exposing apparatus utilizing a storage liquid crystal device (LCD).

BACKGROUND TO THE INVENTION

There is a continuing interest in the generation of colour hardcopy from electronically stored images, e.g. in the fields of colour proofing, and in the reproduction of computer graphics in the form of 35mm slides, overhead transparencies, etc. This is commonly achieved by using the electronic signals to modulate the output of a suitable exposing source, such as a laser or a light emitting diode. Because such devices are normally of very low power, they demand the use of highly sensitive imaging materials in order to achieve realistic scan times. Sensitivities of the order of 0.1 to 1.0 ergs/cm$^2$ are required, such as are shown by the high speed silver halide materials and electrostatic systems. These materials show a number of disadvantages, such as high cost, complex wet processing, and darkroom requirements.

The present invention provides a different method of converting electronic data to colour hardcopy, wherein the electronic signals modulate the optical transmission properties of a liquid crystal array rather than the output of an exposing device. This allows the use of a continuous, high power light source, and hence the use of low sensitivity (typically $10^3$ - $10^2$ ergs/cm$^2$) imaging materials. Such materials can be cheap, dry-processable and white light handleable.

The use of LCD's as programmable light shutters (also known as valves, or gates, or masks) is known and such devices have been used to generate images by allowing transmission of light through the LCD in the image areas only. Japanese Patent Application Publication No. 61-223726 discloses an overhead projector in which information is displayed by a transmission type liquid crystal unit controlled by a microcomputer or word processor. British Patent Applications GB 2144869A and 2069155A and Research Disclosure 27457 disclose apparatus in which a liquid crystal cell is arranged between a light source and photosensitive material and controlled to form a latent image which is recorded on the photosensitive material. The photosensitive materials used include (1) electrostatic media, (2) sensitive paper of the kind which responds to ultra-violet light, and (3) encapsulated monomer, photoinitiator and dye which releases dye in unexposed regions. The production of full-colour hardcopy is not disclosed.

Laser-Addressed Liquid-Crystal Light Modulators for Color Electronic Imaging with Mead Microencapsulated Paper, Sun Lu and Aharon Hochbaum, SID 87 Digest discloses a system which comprises at least three smectic liquid crystal light modules on which are written separation images by means of infra red radiation from a laser diode. Mead color paper, which is a silverless, dry color print paper based upon microencapsulated monomer, photoinitiator and dye, is exposed through each separation image in turn and processed to form the final image.

The present invention provides an alternative system of imaging low sensitivity materials utilising a liquid crystal device.

BRIEF SUMMARY OF THE INVENTION

Therefore according to one aspect of the present invention there is provided a method of producing a full colour image on a photosensitive medium having a sensitivity in the range $10^3$ ergs/cm$^2$ to $10^7$ ergs/cm$^2$ which comprises the steps of:

(i) providing at least three sets of signals, one set of signals being representative of the red content of the desired image, a second set of signals being representative of the green content of the desired image and third set of signals being representative of the blue content of the desired image, (ii) using one of the said set of signals to electronically control a smectic liquid crystal device to generate therein an image mask representative of the red, green or blue content of the desired image, (iii) exposing the photosensitive medium through the liquid crystal device of step (ii), the wavelength of the exposing radiation corresponding to the spectral sensitivity of the medium of the photosensitive element necessary to generate an image having a colour corresponding to the image mask of the liquid crystal device, (iv) repeating steps (ii) and (iii) for the remaining colours and (v) optionally processing the element to generate a stable full colour image.

The invention readily allows full colour images to be produced in low sensitivity photosensitive materials from electronically generated information e.g. computer word processing equipment, video recording equipment, etc., utilizing a smectic liquid crystal to form an image mask based on colour separation information.

DESCRIPTION OF PREFERRED EMBODIMENTS

Figure 1:
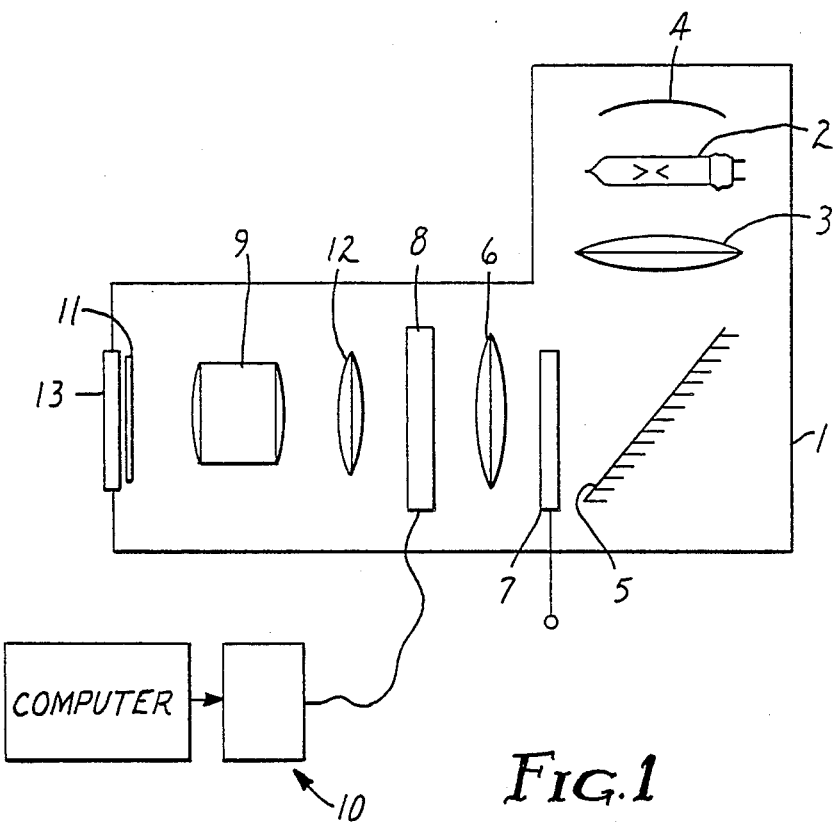
FIG. 1 represents a diagram of an exposing apparatus for use in the invention.

The smectic liquid crystal device comprises a plurality of pixels each of which is individually electronically controlled to act as a shutter. This allows matrix addressing. The LCD is stable and does not require image refreshment by a drive circuit as required by many other types of LCD. The LCD is electronically controlled to provide image masks representative of the colour separation of the desired image rather than being imaged by a scanning laser, electron gun, etc. A single LCD is used to form each of the colour separation masks in turn and problems associated with the accurate registration of separate colour separation masks are obviated.

Typical low sensitivity photosensitive materials may be positive or negative acting and have a sensitivity in the range $10^3$ erg/cm$^2$ to $10^7$ erg/cm$^2$, commonly $10^4$ to $10^6$ erg/cm$^2$ and include dye bleach systems using iodonium salts as disclosed in European Patent Applications 0120601 and 0175504, dye bleach systems using tetra(alkyl)borates as disclosed in U.S. Pat. No. 4,307,655, cyanine dye bleach systems using borate ions as disclosed in British Patent Nos. 1 370 058, 1 370 059 and 1 370 060, and other systems such as those disclosed in J. Kosar, Light Sensitive Systems, Page 387, Wiley, N.Y. 1965.

Negative systems include photothermographic materials such as described in Research Disclosure June 1978 item 17029 based on silver behenates; Colour coupling systems as described ;n Brinckman, Dezenne, Poot and Willems, Unconventional Imaging Processes, Focal Press, London and New York 1978; and silver-free colour imaging systems based on nitrate salts and leuco dyes disclosed in European Patent Application No. 80900104 A.

Preferred photosensitive materials for use in the invention comprise bleachable dyes, most preferably oxonol dyes, in reactive association with iodonium ion (hereinafter referred to as oxonol-iodonium systems). Such materials have a sensitivity of about $8 \times 10^4$ ergs/cm$^2$, which is assessed by measuring the time taken for the transmissive maximum optical density to decrease by one optical density unit on exposure to light of known intensity having a wavelength corresponding to the wavelength of maximum absorbance of the dye in the layer. The energy required is calculated as the product of exposure time and power output and allows the sensitivity of the material to be assessed.

For the purposes of this invention, the sensitivity is taken to be equivalent to the energy per unit area required for the desired change in optical density, be it positive or negative.

For some media, it is possible to increase the sensitivity by heating (e.g. at 60° C.) during the exposure period.

Liquid crystals are characterised by long range orientational ordering among constituent molecules imparting solid like properties in the melts and solutions of organic materials. LCDs are reviewed in Kirk-Othmer Encyclopedia of Chemical Technology 3rd Edition Volume 14 Page 395 (1982).

There are three distinct structural classes of liquid crystals, termed nematic, smectic and cholesteric. These have respectively mono-, di- and tri-dimensional orientation. Of these the smectics offer the possibility of memory devices with high contrast and transmission. Nematics require polarisers to achieve contrast and need refreshment after certain frequencies and thus have an optimum limit for resolution. Within the smectic class are subclasses A to H dependent on the ordering of molecules within the two-dimensional order of the smectic phase. Phases B to H are claimed to have been observed by very slow cooling of the isotropic phase. In the operation of any device, the smectic A phase predominates and is the preferred phase for the LCD used in the invention. For most practical purposes should phases B to H be readily achievable, these would also be usable to act as a high transmission/contrast light gate.

Liquid crystal devices employing liquid crystal polymers may also be employed. Liquid crystal polymers are disclosed in GB 2146787A.

The construction of suitable LCD devices for use in the invention are known and are disclosed, for example, in British Patent Application No. 2 067 811A and U.S. Pat. No. 4,419,664. Generally, the liquid crystal material is contained between glass sheets which have transparent conductors formed upon the inner surfaces terminating at the edge of the glass with electrical connections.

The transparent conductor grids on the glass plates become apparent as a grid of grey lines upon a finished colour image. This effect can be minimised by constructing the display to have many pixels (eg. 150 to 200 pixels/inch, approximately 6 to 8 pixels/mm) and very fine grids, but there is a practical limit to the pixel density which can be economically achieved. The final image may be enhanced by utilizing a large LCD and reductively projecting the image onto the photosensitive medium e.g. by a linear reduction factor of 10:1. The grid lines are then less apparent to any observer and the resolution of the image is also improved.

Each pixel of the LCD may be individually controlled to be in one of two states. In the clear state the pixel is essentially transparent (96% transmissive) and the light beam may pass through uninterrupted. In the 'dark' state the pixel is translucent and light is scattered as it passes through; this is known as dynamic scattering.

The use of an electronically controlled LCD to produce the image mask in combination with low sensitivity photosensitive media requiring long exposure times, i.e. of the order of tens of seconds allows the possibility of the image mask being altered during exposure.

It is well known that in commercial slide projectors there is often a reduction in illumination at the edges, and particularly the corners, of a projected side relative to its centre due to the limitations of the optical system. It is therefore important that any apparatus which may make slides for subsequent projection avoids this fault by ensuring the illumination of any image is even lest the fault be compounded. In the apparatus of the invention, whilst care is taken to make the illumination as even as practicable, there may be variations. As the multiple pixel shutter is electronically addressed, variations in illumination across any image may be adjusted to correct known errors in evenness by varying the film's exposure to light from each pixel by such time as is needed to make the correction. In many cases this may be predetermined and automatically performed by the controlling computer.

The ability to individually vary exposure time for each pixel may be further exploited by restricting or extending the exposure of any part of a colour separation image as its projection falls upon a panchromatic film. Parts of the image may also be projected several times, using two or more of the colour filters in the system. By these means computers normally capable of producing say, four or seven colours in an image, may be programmed to produce many intermediate shades or colours in the image formed in a panchromatic film. If it is desired to produce monochrome images, then variations in pixel projection time may be used to produce grey scales in an image. Typically four or more intermediate density levels are achievable. Alternatively the voltage applied to each pixel may be set at intermediate levels to give intermediate transmissivity. Again at least four levels are achievable. A combination of voltage variance and pixel projection time is also possible. The prior art discloses that such time modulation of the imaging device to achieve grey scale is possible. For example time modulation of LED bars has been shown to yield 8 levels of grey in photographic materials in U.S. Patent Nos. 4,074,318 and 4,074,319. In the present invention the long exposure time necessary for the low sensitivity film actually helps in the production of the grey levels.

The exposure source may conveniently comprise a white light source, such as a tin halide arc or a tungsten filament, which may be filtered by a dichroic mirror to reduce the infrared content if desired. The light is then filtered to allow transmission of the desired wavelength for exposure of the medium of the photosensitive element which must be imaged to correspond to the colour separation image mask formed on the smectic LCD. Normally the light will be sequentially filtered to provide red, green and blue light as the corresponding colour separation images are formed on the LCD. This arrangement has the advantage that a single source may be used, there is no physical movement of the imaging device (LCD) or photosensitive element during the successive colour separation exposures, (only an exchange of filters is required) and accordingly there is no registration problem as far as the colour separation images are concerned. Filters suitable for use with the invention are readily available, e.g. Kodak Wratten filters. They may be positioned between the LCD array and the photosensitive element, but are preferably placed between the light source and the LCD. The various filters, passing light of different wavelengths, may be interchanged manually or mechanically, but in a preferred arrangement the filters are set in a disc, so that by rotating the disc the various filters may be sequentially interposed in the light path. Electronically driven filter shutters may also be employed.

The exposing apparatus includes conventional optics to ensure a beam of uniform intensity. Polarising filters which are commonly and often necessarily used in combination with other LCD devices are not required.

While the use of transmissive smectic liquid crystals is preferred, reflective smectic liquid crystal displays may be employed with suitable alteration of the optical arrangement.

The invention will now be described with reference to the accompanying drawings.

The apparatus of FIG. 1 allows exposure of low sensitivity media ($10^3$ to $10^7$ ergs/cm$^2$) with electronically described information. A specific application for which this apparatus has potential is as a desk-top usable, computer driven 35 mm slide making system.

The apparatus comprises a rigid base (1) and has a radiation source (2) which may conveniently comprise a 220 watt Tin Halide Arc Lamp type SN 220 manufactured by Philips emitting over the 400 to 700 nm region. Light passes from the source directly through a condenser lens (3) and indirectly from a concave mirror (4) through the lens (3). The light is then directed onto a dichroic mirror (5) constructed and arranged to reflect light in the visible region through 90 degrees and transmit infrared radiation which is thus removed from the system which might otherwise become overheated. Light then passes through a second lens (6) and optionally interchangeable colour filters (7) before evenly illuminating an electronically controlled LCD device (8) as a collimated beam. A projection lens (9) centered on the axis of the beam is set at a distance such that it accepts light which has passed directly through the LCD, but only a very small part of that which has been scattered reaches the lens, and that scattered by more than 15 degrees from the axis is completely lost. Thus images produced by a computer and an appropriate interface (10) may be displayed and a high contrast image projected on to the photosensitive film (11). The optional lens (12) is one of low reflective power and is moveable so the image may easily be focused. The film is supported by a platen (13) which may be thermostatically heated to a temperature above ambient, commonly 60° C., selected to give optimum conditions for the reaction of the photochemical elements contained within the film. Preferably, the film is premounted in a transparency holder or frame eg. a 35 mm slide transparency holder.

A fan (not shown) may be present to control the internal temperature of the apparatus and a mechanically operated shutter may be interposed in the optical path and used to protect the film from stray light while the films are being changed, or while the mask displayed on the liquid crystal display is being re-written (changed).

Figure 2:
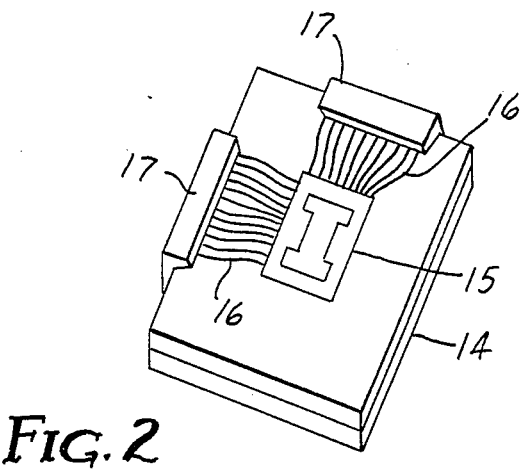
FIG. 2 represents a diagram of a smectic liquid crystal device suitable for use in the apparatus of FIG. 1.

A suitable constructions of LCD used in this invention is shown in FIG. 2.

The body of the display (14) is rectangular and made from glass sheets which contain the liquid crystal material with which the image (15) is formed. The transparent conductors communicating with the liquid crystal material are formed upon the inner surfaces of the glass, and electrical connections (16) are carried to the edge of the glass to a plug and socket connector (17) which is further connected to the controlling computer and interface (10).

Full colour images may be made by sequentially exposing a panchromatic photosensitive film to red, green and blue monochrome images produced by exposing appropriate areas of the image through coloured filters (7). As each pixel of the LCD shutter (8) is electronically controlled, this is easily achieved by using well known computer programs for colour separating images.

A suitable medium for use in this apparatus is a dye bleach film using chemistry disclosed in European Patent Application EP 0120601A and U.S. Pat. Nos. 4,632,895 and 4,701,402 in which oxonol dyes are bleached by the action of light in the presence of iodonium salts. These types of film are positive acting and work by light of a particular colour bleaching the dye(s) corresponding to that colour but leaving the dyes which form the desired colour. The films have a low sensitivity at room temperature and may be handled for a few minutes in subdued lighting without significant loss of density. However, when placed upon the heated support of the apparatus the sensitivity increases and the film may be bleached in less than 40 seconds.

Typically, a panchromatic dye bleach film as used in this invention is constructed of 3 layers (yellow, magenta and cyan) upon a transparent polymer supporting film. The gelatin layers have oxonol dyes with maximum absorptions in the blue, green and red regions of the visible spectrum respectively, together with an iodonium salt, and stabilising and surfactant additives to ensure ease of coating.

After exposure, each transparency is fixed to stabilise the image, e.g. by washing in water, or by means of the dry fix process described in European Patent Application No. 0 175 504A. Some typical results obtained with the described device and film are shown in the Table below.

| NO. | COLOUR FILTER | SECONDS EXPOSURE REQUIRED | FINAL IMAGE COLOUR |
| --- | --- | --- | --- |
| 1 | NONE | 0 | BLACK |
| 2 | NONE | 10 | CLEAR |
| 3 | *29(red) | 40 | RED |
| 4 | *47b(blue) | 40 | BLUE |
| 5 | *61(green) | 40 | GREEN |

*Eastman Kodak Wratten transmitting filter

Should "prints" be required, i.e. images upon an opaque base, then films or coated papers as described in European Patent Application EP 0 175 504A may be used, in which the image is stabilised by dye transfer to the opaque substrate.

Diffusion transfer films made using the system described in EP 0 175 504A use a three layer construction with dyes of similar sensitivity to those described above, but are coated as a dispersion in oil which increases the mobility of the reactants compared to a gelatin film coating. Thus a higher photographic "speed" may be achieved. The images on this film are stabilised by diffusion onto a receptor using an ethanol and water mixture to mobilise the dyes. This process has the advantage that the background minimum density, Dmin, is very low and the image can be transferred to an opaque substrate. Full colour images can be made with approximately 1 minute exposure (20 seconds for each colour), 2 minutes processing time, and thereafter drying time causing overall a four minute total.

The use of slow media requires large and powerful lamps in the device. This leads to inevitable penalties of cost, size and radiated heat. In order to keep these burdens as low as possible, it is desirable that any part of the equipment designed to transmit light shall do so as efficiently as possible. In particular the LCD shutter needs, when it is in non-scattering mode, to be very efficient, preferably greater than 96% visible light transmittance, and should exhibit a high image contrast without the need of polarisers. When the lamp is lit, the temperature within the equipment as shown in FIG. 1 may rise by 30° C., and it is important that the LCD used will be stable over at least this range of temperatures. The smectic LCD of the invention meets all these requirements. Suitable devices are available from Image Displays Limited.

The invention will now be illustrated by the following Example:

EXAMPLE

The dyes used in this Example were:

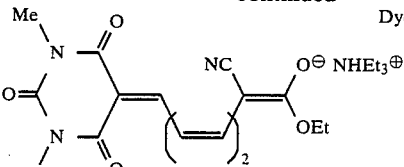

Dye (1) (YELLOW)

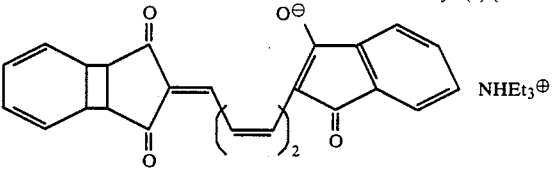

Dye (2) (YELLOW)

-continued

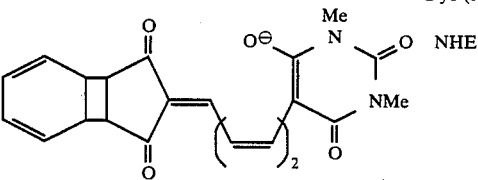

Dye (3) (MAGENTA)

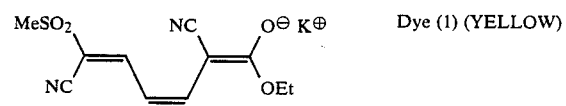

Dye (4) (CYAN)

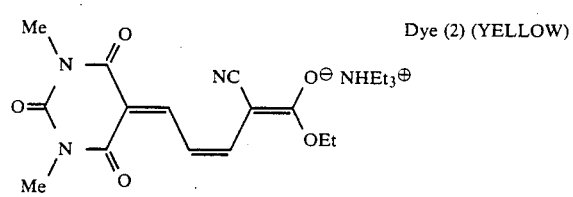

Dye (5) (CYAN)

1. YELLOW SOLUTION

Dyes (1) and (2) (0.34 and 0.70 g respectively) were dissolved with heating (50° C.) in ethanol (50ml) and water (20ml). This solution was added with stirring to a 10% aqueous solution of gelatin (300ml) at 40° C. containing poly (4-vinyl-1-methylpyridinium) methosulphate, "PVP" (4g) dissolved in glacial acetic acid (3ml), and 10 ml Tergitol TMN-10 10% aqueous surfactant. Tergitol TMN-10 is an ethoxylated nonanol nonionic surfactant commercially available from Union Carbide.

To this dyed gelatin solution was added in red safelight conditions an iodonium salt solution of 4-butoxyphenylphenyliodonium trifluoracetate (8g) in ethanol (8ml) with N,N-dimethylformamide (2ml) and water (2ml).

Just before coating 0.4g of chrome alum in 4 ml water was stirred into the gelatin solution.

2. MAGENTA SOLUTION

The solution was prepared exactly as above, but with magenta Dye (3) (0.66g) dissolved in ethanol (50ml) and water (20ml) with the previously described iodonium salt solution.

3. CYAN SOLUTION

This was prepared exactly as the above solutions, but containing cyan Dyes (4) and (5) (0.30g and 0.15g) dissolved in ethanol (50ml) and water (10ml). 15ml of aqueous Tergitol TMN-10 (10%) was then added together with the previously described iodonium salt solution.

The cyan solution was prepared and coated in green light.

4. TOP COAT SOLUTION

To a 250ml of 4% aqueous gelatin at 40° C. was added 1g of PVP with 1 ml of glacial acetic acid and 15 ml of a 10% solution of Tergitol TMN-10 surfactant.

5g Gasil 23F (a silica powder commercially available from Crosfield Silicas Ltd.) was stirred into the gelatin as was chrome alum (0.2g in 2 ml water).

The following layers were precision coated onto 101 micron subbed polyester film. Each dye layer deposited at 125 ml/min and the top coats at 30 ml/min at a web speed of 5 m/min. The films were dried by air blowing as described in U.S. Pat. No. 4,701,402 to yield thicknesses as shown:

| | |
|---|---|
| Top Coat | (0.5 micron) |
| Yellow | (7 micron) |
| Polyester Base | |
| Magenta | (7 micron) |
| Cyan | (7 micron) |
| Top Coat | (0.5 micron) |

The resulting panchromatic constructions were kept in dark conditions.

It was found that exposure in apparatus of FIG. 1, using the colour filters described previously gave the following colour images. The red, blue and green filters gave respectively red, blue and green images after 40 seconds of exposure to the filtered 220 watt tin halide arc lamp. The platten on which the film was supported was maintained at approximately 60° C. during the exposure.

The high resolution smectic liquid crystal device Type IN4-200 was supplied by Image Displays Ltd., United Kingdom. The LCD image was controlled by a computer. The LCD was substantially A4 size and was projected onto the film of 35 mm format, a linear reduction of approximately 10:1.

After exposure each side of the film was bought into contact with a fixing agent which then stabilised the dye image, preventing further fading.

The resultant film was viewed by projection. The imaged film was placed in a 35mm slide holder in a 35mm slide projector to give a full colour graphic reproduction of the desired information.

This film had a sensitivity of approximately $10^5$ ergs/cm$^2$.

A sample of the film described above was placed into the exposure apparatus with the yellow emulsion facing the exposing light. No filters were employed.

Figure 4:
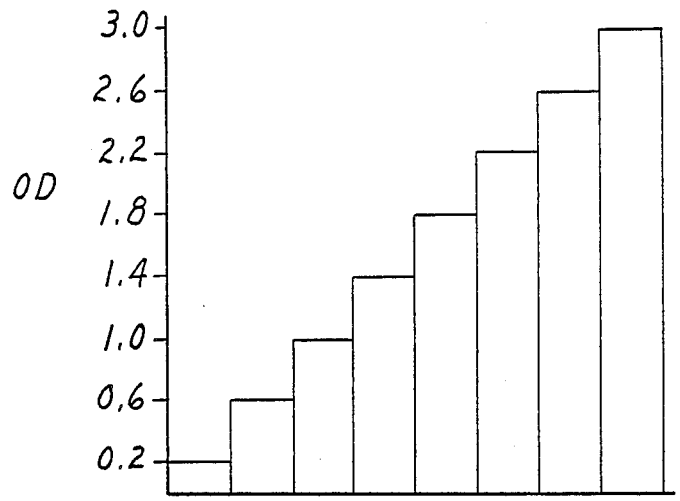
Figure 3:
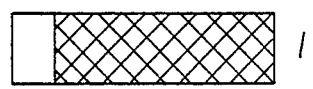
FIG. 3 represents a diagram of a sequence of image masks on the smectic liquid crystal device and, FIG. 4 represents a plot of optical density across an image produced using the image masks of FIG. 3.
Figure 3:
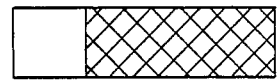
Figure 3:
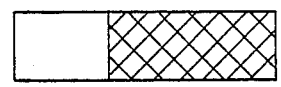
Figure 3:
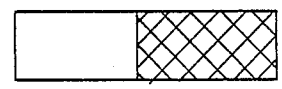
Figure 3:
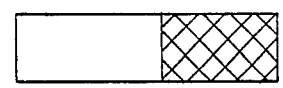
Figure 3:
Figure 3:
Figure 3:

The images 1 to 8 shown in FIG. 3 were sequentially fed into the liquid crystal display using a scanner at 200 dpi digitisation and on Atari 1040ST computer. The light source was illuminated continuously and each separate image mask was formed for 5 seconds. Exposure was ceased after 40 seconds. The resulting image on the film is represented in FIG. 4 as a plot of optical density across the image which clearly illustrates that a tonal or grey scale may be obtained in accordance with the invention by altering the image mask on the liquid crystal during exposure i.e. a time modulated grey or tonal scale was achieved.

What we claim is:

1. A method of producing a full colour image on a photosensitive medium having a sensitivity (as herein defined) in the range $10^3$ ergs/cm$^2$ to $10^7$ ergs/cm$^2$ which comprises the steps of
   (i) providing at least three sets of signals, one set of signals being representative of the red content of a desired image, a second set of signals being representative of the green content of said desired image and third set of signals being representative of the blue content of said desired image,
   (ii) using one of the said set of signals to electronically control a smectic liquid crystal device to generate therein a two-dimensional image mask representative of the red, green or blue content of said desired image,
   (iii) exposing the photosensitive medium through the liquid crystal device of step (ii), the wavelength of the exposing radiation corresponding to the spectral sensitivity of the medium of the photosensitive element necessary to generate an image having a colour corresponding to the image mask of the liquid crystals device,
   (iv) repeating steps (ii) and (iii) for the remaining colours without moving said liquid smectic crystal device or said medium and
   (v) optionally processing the element, to generate a stable full colour image.

2. A method according to claim 1 wherein said photosensitive element comprises a dye bleach photosensitive medium.

3. A method according to claim 2 wherein said photosensitive material comprises oxonol dye in reactive association with iodonium ion.

4. A method according to claim 3 additionally comprising heating said photosensitive element to a temperature of about 60° C. during exposure.

5. A method according to claim 1 wherein said source of radiation is a white light source which is filtered to the desired wavelength for each exposure.

6. A method according to claim 1 wherein the liquid crystal device is controlled to alter pixels during the exposure.

7. A method according to claim 1 wherein said image mask of the liquid crystal device is reductively projected onto the photosensitive medium.

8. Apparatus for exposing a photosensitive element comprising,
   (i) means for sequentially supplying radiation of at least three different wavelengths,
   (ii) a smectic liquid crystal device comprising a plurality of pixels in two dimensions across said device each pixel capable of acting as a shutter,
   (iii) control means for forming an image on said smectic liquid crystal device in response to electronic information representative of a two dimensional colour separation of the desired image and
   (iv) means for supporting the photosensitive material, the apparatus being constructed and arranged such that the photosensitive material is exposed in two dimensions only by radiation passing through the smectic liquid crystal device without movement of the liquid crystal device or said medium.

9. Apparatus according to claim 8 wherein said means for supporting the photosensitive material comprises means for heating the photosensitive material during exposure.

10. Apparatus according to claim 8 comprising a white light source, means for filtering the infra-red content and filters to allow the sequential transmission of radiation of at least three different wavelengths.

11. Apparatus according to claim 8 comprising means for reductively projecting said image on said smectic liquid crystal device onto said photosensitive medium.

12. The apparatus of claim 10 further comprising an element having at least three filters of different wavelengths thereon, said element being able to rotate within said apparatus to position only one of said at least three filters between said means for supplying radiation and said liquid smectic crystal device.

* * * * *